US010850957B2

(12) United States Patent
Perrin (10) Patent No.: US 10,850,957 B2
(45) Date of Patent: Dec. 1, 2020

(54) EFFORT TRANSMISSION MODULE

(71) Applicant: Schneider Electric Industries SAS, Rueil Malmaison (FR)

(72) Inventor: Denis Perrin, Saint Nicolas de Macherin (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 16/374,092

(22) Filed: Apr. 3, 2019

(65) Prior Publication Data
US 2019/0330032 A1 Oct. 31, 2019

(30) Foreign Application Priority Data

Apr. 26, 2018 (FR) ...................................... 18 53683

(51) Int. Cl.
*B66D 5/34* (2006.01)
*B25B 23/00* (2006.01)
*F16D 11/06* (2006.01)

(52) U.S. Cl.
CPC ............ *B66D 5/34* (2013.01); *B25B 23/0028* (2013.01); *F16D 11/06* (2013.01)

(58) Field of Classification Search
CPC .... B66D 1/04; B66D 1/06; B66D 5/34; B25B 23/0028; F16D 11/06
See application file for complete search history.

(56) References Cited

U.S. PATENT DOCUMENTS

| 2,946,563 | A | * | 7/1960 | Eaton | B66D 1/04 410/37 |
| 3,799,005 | A | * | 3/1974 | Koehler | B66D 1/04 475/12 |
| 4,591,029 | A | * | 5/1986 | Da Foe | B66D 1/06 188/134 |
| 4,596,310 | A | * | 6/1986 | Hatakeyama | H01H 3/3021 185/40 R |
| 4,723,757 | A | * | 2/1988 | Steinman | B66D 5/34 254/369 |

(Continued)

FOREIGN PATENT DOCUMENTS

GB 830545 A * 3/1960 ............. B66C 13/00

OTHER PUBLICATIONS

Preliminary Report and Written Opinion dated Jan. 31, 2019 in French Patent Application No. 1853683 (with English Translation of Category of Cited Documents), 7 pages.

*Primary Examiner* — Michael E Gallion
(74) *Attorney, Agent, or Firm* — Oblon, McClelland, Maier & Neustadt, L.L.P.

(57) ABSTRACT

A module for transmission of a force including two toothed wheels which are connected to a main shaft; a first ratchet holder and a second ratchet holder which are provided with a first ratchet and a second ratchet, and are designed such, when they are actuated, to rotate the toothed wheels by support of the ratchet concerned against a tooth of the toothed wheel; a first cam and a second cam, which are designed to actuate respectively the first ratchet according to a first angular course around an axis YY' of the first cam, and the second ratchet according to a second angular course around the axis YY' of the second cam, which is different from the first angular course.

14 Claims, 7 Drawing Sheets

(56) References Cited

U.S. PATENT DOCUMENTS

| | | | | |
|---|---|---|---|---|
| 5,020,648 | A * | 6/1991 | Bush | F16D 7/048 |
| | | | | 188/82.6 |
| 5,458,318 | A * | 10/1995 | Jussila | B66D 1/06 |
| | | | | 188/180 |
| 5,904,341 | A * | 5/1999 | Norrby | B60P 7/083 |
| | | | | 254/214 |
| 6,087,610 | A * | 7/2000 | Castonguay | H01H 3/3021 |
| | | | | 200/400 |
| 6,494,435 | B1 * | 12/2002 | Cauchon | B60P 7/083 |
| | | | | 254/213 |
| 9,443,687 | B2 * | 9/2016 | Cazals | H01H 71/04 |
| 10,266,377 | B2 * | 4/2019 | Bryan | B66D 5/34 |
| 2002/0166999 | A1 * | 11/2002 | Topping, Jr. | B66D 5/34 |
| | | | | 254/376 |
| 2003/0047726 | A1 * | 3/2003 | Nam | B66D 5/34 |
| | | | | 254/267 |
| 2010/0001243 | A1 * | 1/2010 | Amoss | B66D 1/06 |
| | | | | 254/375 |
| 2015/0197413 | A1 * | 7/2015 | Doig | B63C 3/02 |
| | | | | 414/800 |
| 2016/0343520 | A1 * | 11/2016 | Yang | H01H 3/3031 |
| 2017/0362066 | A1 * | 12/2017 | Grapes | B66D 1/06 |

* cited by examiner

EFFORT TRANSMISSION MODULE

TECHNICAL FIELD

The present invention relates to a module for transmission of force, and in particular to a double ratchet transmission module. More particularly, the present invention relates to a module for transmission of force which is designed to transmit a force to a system for accumulation of mechanical energy, in particular to a spring for closure of an electrical cut-off device, such as a circuit breaker, a switch or an isolating switch.

PRIOR ART

A module for transmission of force known in the prior art comprises:

at least one toothed wheel which is connected in a fixed manner on a main shaft, designed to transmit a force to a system for accumulation of energy via the main shaft;

a system for rotation of the toothed wheel in a direction of rotation, which is known as the direct direction, around the main axis.

In general, the system for accumulation of energy is a system for accumulation of mechanical energy, and in particular a spring for closure of a current cut-off device such as a circuit breaker.

The drive system can in particular comprise ratchet systems.

In particular, documents [1] and [2] cited at the end of the description each propose a drive system which is provided with a plurality of ratchets. However, their arrangement and their driving mode do not lend themselves to rotation without jolting of the toothed wheel, and consequently limit the mechanical durability of the transmission module.

In this respect, the emergence of renewable energies, and the increase in the number of decentralised energy production sources, are imposing far more frequent manoeuvres of the electrical cut-off devices, and consequently of the force transmission module. It is therefore necessary to be able to have a force transmission module which can carry out for example 30,000 cycles as opposed to the present 10,000 cycles.

A planetary gear train, instead of, and in the place of, the ratchet systems, has been able to be implemented in order to eliminate the aforementioned problems.

However, a drive system of this type is not satisfactory. In fact, a planetary gear train comprises a large number of parts, and is consequently complicated to implement from a technical point of view. It is also relatively costly.

In particular, the parts which constitute the planetary gear train comprise in particular gears, the production of which requires a particularly high degree of precision, which is accordingly to the detriment of their production cost.

An objective of the present objective is thus to propose a force transmission module which is simpler to implement than the transmission module known in the prior art.

Another objective of the present invention is also to propose a force transmission module with significant mechanical durability, which in particular is able to withstand at least 30,000 cycles.

Another objective of the present invention is also to propose a force transmission module wherein the force of driving by a plurality of ratchets of the toothed wheel can be alleviated such as to limit the wear of the transmission module and its motorisation.

Another objective of the present invention is also to propose a force transmission module which permits manual actuation.

Finally, another objective of the present invention is to propose a force transmission module, the production and implementation costs of which are optimised.

SUMMARY OF THE INVENTION

The objectives of the present invention are at least partly achieved by a module for transmission of a force comprising:

at least one toothed wheel which is connected in a fixed manner to a main shaft which extends according to a main axis XX';

at least one first ratchet holder and one second ratchet holder which are provided respectively with a first ratchet and a second ratchet, each of the first and second ratchets being designed such as, when it is actuated, to rotate the toothed wheel in a direction, known as the direct direction, around the main axis, by support of the ratchet concerned against a tooth of the toothed wheel;

at least two cams, which are connected immovably to one another, known respectively as the first cam and second cam, and are designed to actuate respectively the first ratchet according to a first angular course around an axis YY' of the first cam, and the second ratchet according to a second angular course around the axis YY' of the second cam, which is different from the first angular course.

According to one embodiment, the first angular course and the second angular course have zero overlapping, and their sum is 360°.

According to one embodiment, the first angular course and the second angular course are each equal to 180°.

According to one embodiment, the at least two cams are designed such that the actuation of one and/or the other of the first and second ratchets by the cam which is designed to actuate it is preceded directly by a phase of engagement of the said ratchet by this same cam, the engagement phase comprising supporting the ratchet concerned against a tooth of the at least one toothed wheel according to an angular course of engagement of the said cam.

According to one embodiment, the at least two cams are designed such that the actuation of one and/or the other of the first and second ratchets by the cam which is designed to actuate it is followed directly by a phase of disengagement of the said ratchet by this same cam, the disengagement phase comprising a decrease in the support of the ratchet against the tooth according to a law of continuous decrease of the said support according to an angular course of disengagement of the said cam.

According to one embodiment, the first ratchet holder and the second ratchet holder are each in pivoting connection with the main shaft.

According to one embodiment, the at least two cams are integral with a camshaft extending according to the axis YY', substantially parallel to the main axis XX'.

According to one embodiment, the first ratchet holder and the second ratchet holder are each provided with a roller, known respectively as the first roller and the second roller, against which the first cam and the second cam abut respectively according to their contour, with the first cam and the second cam enforcing the actuation respectively of the first ratchet and the second ratchet, respectively via the first roller and the second roller, and their respective ratchet holders.

According to one embodiment, the at least one toothed wheel comprises a first toothed wheel and a second toothed wheel which are advantageously identical, and are designed to be rotated respectively by the first ratchet and the second ratchet.

According to one embodiment, a complete revolution around the axis YY' by the assembly formed by the first and second cams gives rise to the rotation of the at least one toothed wheel according to an angular course corresponding to a tooth of the at least one toothed wheel.

According to one embodiment, the transmission module comprises means for rotation of the at least two cams around the axis YY', with the drive means advantageously comprising a motor and a reducer (gear motor) or a crankshaft.

According to one embodiment, the first ratchet holder and/or the second ratchet holder are also designed to be manoeuvred manually.

According to one embodiment, the main shaft comprises two cams, at least one of which is designed to transfer a mechanical force to a mechanical accumulation system.

According to one embodiment, the mechanical accumulation system comprises a compression spring.

The invention also relates to an electrical device comprising a module for transmission of a force according to the present invention.

BRIEF DESCRIPTION OF THE DRAWINGS

Other characteristics and advantages will become apparent from the following description of a module for transmission of a force according to the invention, provided by way of non-limiting example, with reference to the appended drawings in which.

DETAILED DESCRIPTION OF PARTICULAR EMBODIMENTS

The present invention proposes a module for transmission of force which comprises a toothed wheel provided with a main axis, which module is designed to transmit the force to a system for accumulation of mechanical energy.

According to the present invention, the toothed wheel is rotated by two ratchets, which are known as the first ratchet and the second ratchet, and are actuated independently and alternately by two cams, known as the first and second cam, which are integral with a single camshaft.

In particular, the cam profiles are designed such that a continuous force without jolting is exerted on the toothed wheel.

The present invention will now be described in detail and in relation with FIGS. 1 to 3.

Figure 1:
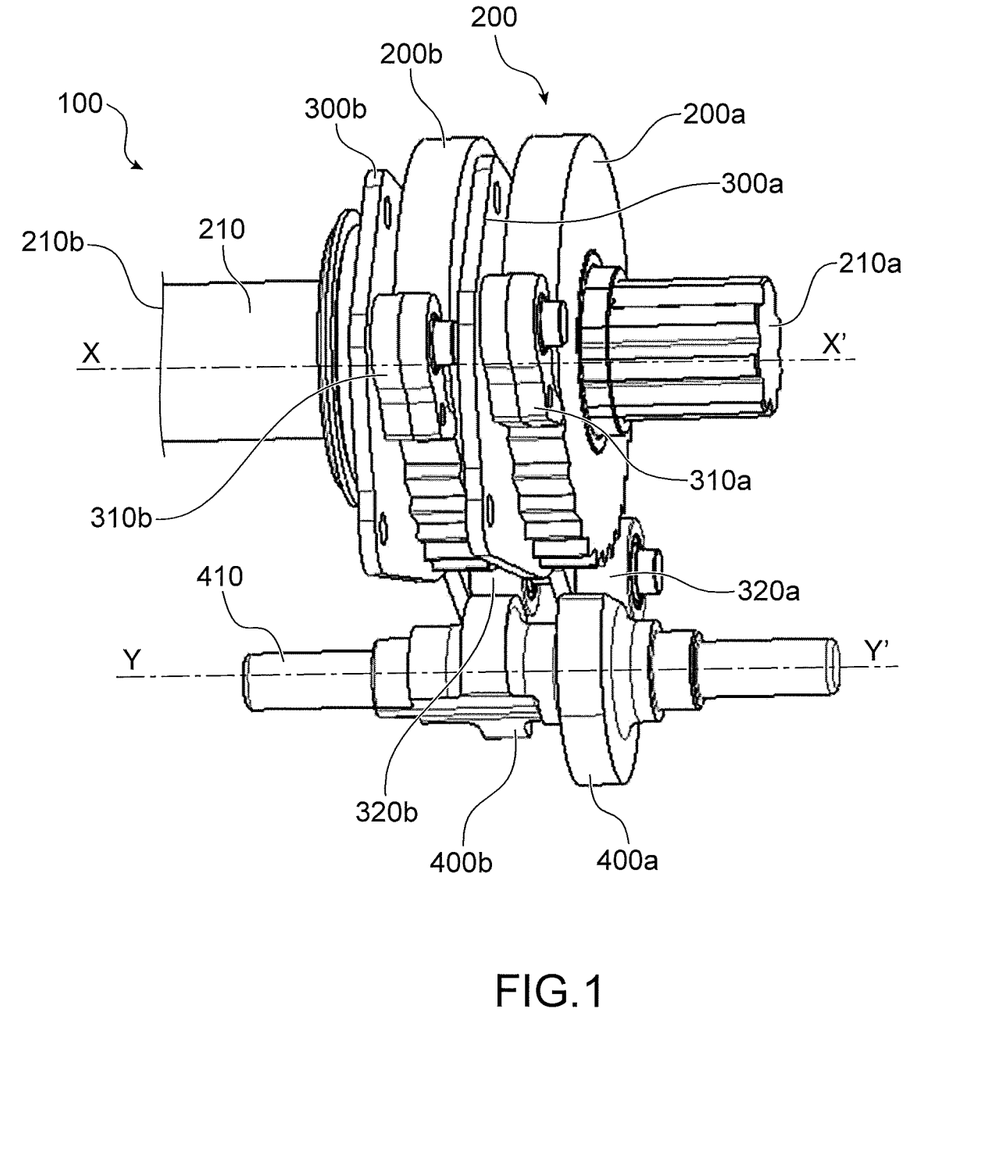
FIG. 1 is a schematic representation of the transmission module according to the present invention, according to a view in perspective.

The transmission module 100 comprises at least one toothed wheel 200 integral with a main shaft 210 which extends according to a main axis XX' (FIG. 1).

"Toothed wheel" means a wheel which is provided with teeth over at least part of its periphery, for example over half of its periphery.

It is also understood that, according to the present invention, a toothed wheel which is integral with a main shaft implies a fixed connection between the said wheel and the said shaft. However, the fixed connection does not prevent the dismantling of the at least one toothed wheel which can slide along the main shaft.

The at least one toothed wheel 200 can also comprise a first toothed wheel 200a and a second toothed wheel 200b. The first and second toothed wheels 200a and 200b are advantageously identical, parallel to one another, and with the same orientation.

The main shaft 210 comprises a first end 210a and a second end 210b.

One or the other of the first and second ends 210a and 210b, for example the second end 210b, comprises ribbing or teeth which are designed to transmit the force to a system for accumulation of mechanical energy.

Figure 3:
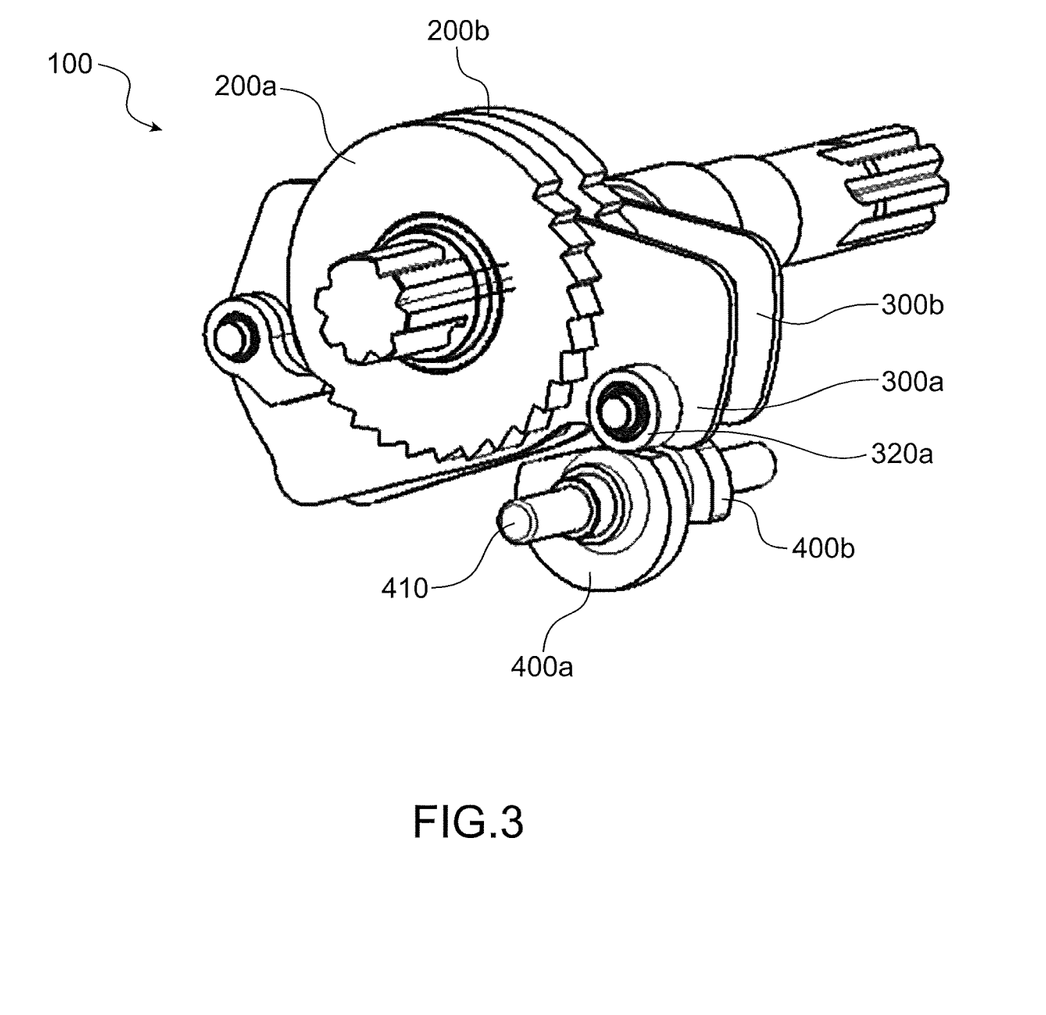
FIG. 3 is a schematic representation of the transmission module according to the present invention, according to a view in perspective.

The transmission module 100 comprises at least one first ratchet holder 300a and at least one second ratchet holder 300b, which are provided respectively with a first ratchet 310a and a second ratchet 310b (FIGS. 1 and 3).

A ratchet holder comprises for example a plate, preferably made of metal, on which the ratchet is secured.

The first ratchet 310a and the second ratchet 310b are designed, when they are actuated, to rotate the at least one toothed wheel 200 according to a first direction around the main axis XX'.

In particular, the rotation of the at least one toothed wheel 200 is caused by support of the ratchet concerned against a tooth of the at least one toothed wheel.

It is thus understood that the rotation of the at least one toothed wheel by one or the other of the first and second ratchets 310a and 310b is executed by application of a mechanical force by the ratchet concerned against a tooth of the said wheel.

According to the present invention, it is understood that the first ratchet and the second ratchet can both act on the same wheel, or can each act on a different wheel. For example, the first ratchet 310a and the second ratchet 310b can be designed to rotate the first wheel 200a and the second wheel 200b respectively.

Contrary to the planetary gear train known in the prior art, the ratchet holders and ratchets are technically simple to implement, and do not require any particular precaution, such as the implementation of a demultiplication stage which is designed to protect them.

In addition, the first ratchet holder 300a and the second ratchet holder 300b can be identical, such that their integration in the transmission module 100 is facilitated, and pairing of them with the cams is not necessary.

Furthermore, the implementation of ratchet holders requires fewer parts, and is relatively economical in comparison with a planetary gear train.

It is also understood, without needing to be specific, that the first and second ratchets are each provided with a return system, in particular a spring, which is designed to force the contact between each ratchet and the at least one toothed wheel.

The return system also makes it possible to return the roller such that it abuts against the cam when the latter is no longer acting on the said roller.

Figure 2:
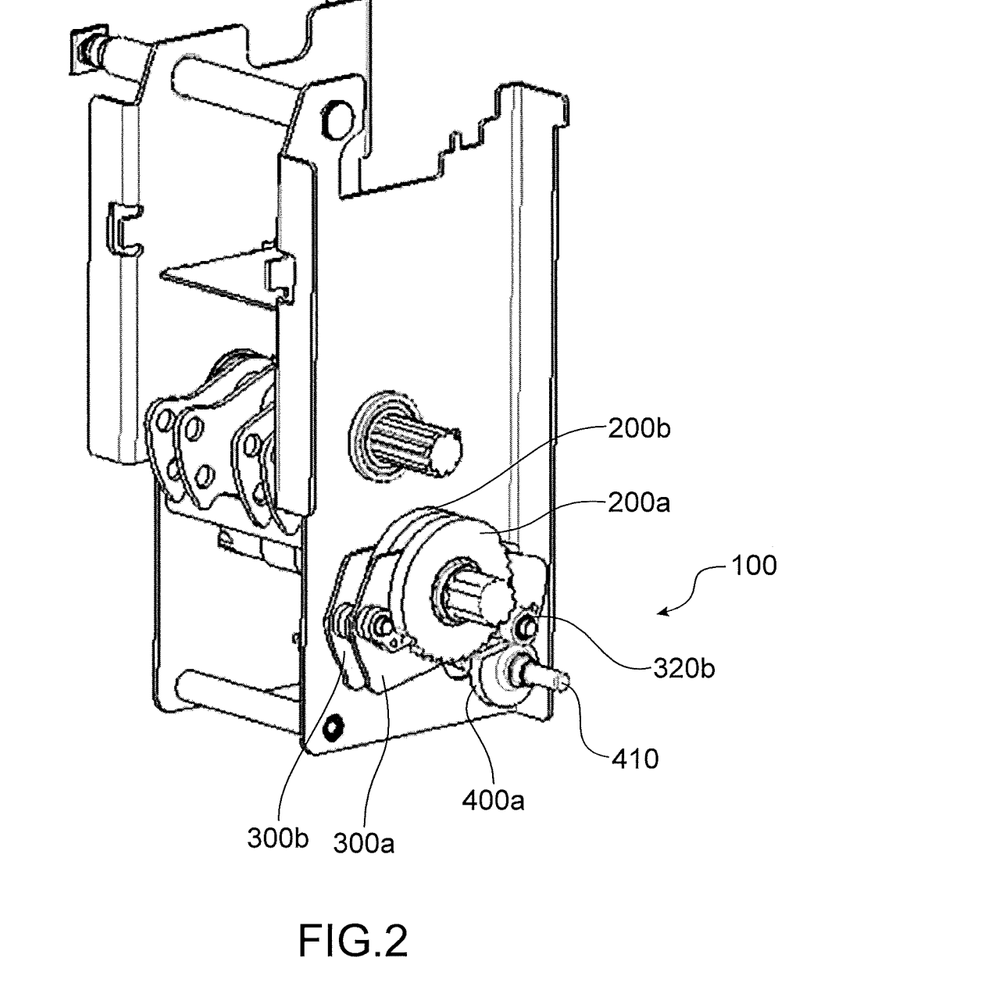
FIG. 2 is a schematic representation in perspective of the transmission module according to the present invention, integrated in a mechanism for control of an electrical cut-off device.

The transmission module 100 also comprises a first cam 400a and a second cam 400b which are connected by a fixed connection (FIGS. 1 to 3).

The invention is described with two cams, however persons skilled in the art will be able extend the principles described to a larger number of cams.

According to the present invention, it is understood that the two cams are also designed to turn around an axis YY' (FIG. 1).

Advantageously, the axis YY' is substantially parallel to the main axis) XX'.

Again advantageously, the first and second cams 400a and 400b are integral with a camshaft 410 which extends according to the axis YY' (FIGS. 1 to 3).

The transmission module 100 can advantageously comprise means for rotation of the at least two cams around the axis YY'. In particular, the drive means can comprise an electrical control which acts on a gear motor or a crankshaft.

The first cam 400a and the second cam 400b are designed to actuate alternately, respectively, the first ratchet 310a and the second ratchet 310b, via the ratchet holders.

By "actuate alternately", it should be understood that the two ratchets act according to two different temporal phases, which can however overlap. In other words, there can be a period of time which is globally shorter than each of the two temporal phases, during which the two ratchets 310a and 310b are actuated and both drive the at least one toothed wheel 200.

It is understood that the actuation of one or the other of the first and second ratchets respectively by the first cam and the second cam depends on the cam profile, and more particularly on the contour of the said first and second cams.

The first cam 400a is designed in particular to actuate the first ratchet 310a according to an angular course, known as the first angular course, around the axis YY'.

In an equivalent manner, the second cam 400b is designed to actuate the second ratchet 310b according to an angular course, known as the second angular course, around the axis YY'.

"Angular course" means a continuous range of angles of rotation of the assembly formed by the first cam and the second cam. It is understood that an angular course can adopt any value between 0° and 360°.

The profile of the first cam 400a according to the first angular course can advantageously be designed such that the first ratchet imposes a constant torque throughout the entire duration of the said first course, on the at least one toothed wheel, and in particular the first toothed wheel.

In an equivalent manner, the profile of the second cam 400b according to the second angular course can advantageously be designed such that the second ratchet imposes a constant torque throughout the entire duration of the said second course, on the at least one toothed wheel, and in particular the second toothed wheel.

Particularly advantageously, the first angular course and the second angular course have zero overlapping, and their sum is equal to 360°.

Thus, during a complete revolution of the assembly formed by the first cam and the second cam around the axis YY', the at least one toothed wheel and the camshaft turn substantially continuously with little or no jolting.

Again advantageously, the first angular course and the second angular course are each equal to 180°.

The combination of these two characteristics advantageously makes it possible to alleviate at least partly the force exerted on the teeth of each of the first and second toothed wheels, and consequently limit the stresses which are liable to damage and/or affect the reliability of the first and second toothed wheels. This arrangement also makes it possible to preserve both the camshaft and its drive system (gear motor).

By way of example, a complete revolution around the axis YY' of the assembly formed by the first and second cams 400a and 400b induces the rotation of the first and second toothed wheels according to an angular course corresponding to a tooth of each of these two wheels.

According to an advantageous embodiment, the first cam and the second cam can be arranged such that the actuation of one and/or the other of the first and second ratchets by the cam which is designed to actuate it is preceded directly by a phase of engagement of the said ratchet by this same cam. A phase of engagement comprises supporting one or the other of the first and second ratchets against a tooth, respectively of the first toothed wheel or the second toothed wheel, according to an angular course of engagement of the cam concerned.

Again according to an advantageous embodiment, the first cam and the second cam can be designed such that the actuation of one and/or the other of the first and second ratchets by the cam which is designed to actuate it is followed directly by a phase of disengagement of the said ratchet by this same cam, the disengagement phase comprising a decrease in the support of the ratchet against the tooth according to a law of continuous decrease of the said support according to an angular course of disengagement of the said cam.

It is understood that the phases of engagement and disengagement relate to a particular profile of one and the other of the first and second cams over a predetermined angular course. These adjustments of profile are within the scope of persons skilled in the art, and can in particular correspond to an increase and a decrease in the force exerted on the ratchet.

According to an advantageous embodiment, the first ratchet holder 300a and the second ratchet holder 300b are each in pivoting connection with the main shaft 210 (FIG. 1).

In particular, each ratchet holder 300a and 300b comprises an opening in which the main shaft 210 is inserted. An arrangement of this type makes it possible to provide the transmission module with the compactness necessary for its use in a reduced space.

The first ratchet holder 300a and the second ratchet holder 300b can each be provided with a roller, known respectively as the first roller 320a and the second roller 320b (FIG. 1).

The first and second rollers 320a and 320b permit in particular the respective actuations of the first and second ratchets 310a and 310b. In particular, the first cam 400a and the second cam 400b act respectively on the first roller 320a and on the second roller 320b.

In operation, the first cam 400a abuts against the first roller 320a at its contour, known as the first contour. Thus, during its rotation according to the first angular course, the first cam 400a thrusts the first roller 320a, and by way of active consequence, the first ratchet 310a (since the first roller and the first ratchet are integral with the same ratchet holder).

The second cam 400b abuts against the second roller 320b at its contour, known as the second contour. Thus, during its rotation according to the second angular course, the second cam 400b thrusts the second roller 320b, and by way of active consequence, the second ratchet 310b (since the second roller and the second ratchet are integral with the same ratchet holder).

FIGS. 4a to 4g are schematic representations of the different operating sequences of the transmission module in its entirety, according to a profile view, and in particular according to a profile view which permits observation of the first wheel, the first ratchet, and the first cam.

FIGS. 5a to 5g are schematic representations according to operating sequences of the transmission module which are identical respectively to FIGS. 4a to 4g, and also according to an identical profile view, with the mechanism associated with the first wheel, the first ratchet and the first cam being however eliminated such as to permit the observation of the second wheel, the second ratchet and the second cam.

Figure 4A:
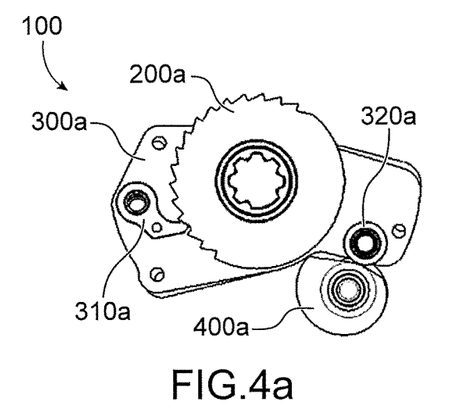
FIGS. 4a to 4g are schematic representations of the different operating sequences of the transmission module as a whole, according to a profile view, and in particular according to a profile view which permits observation of the first wheel, the first ratchet and the first cam.
Figure 4B:
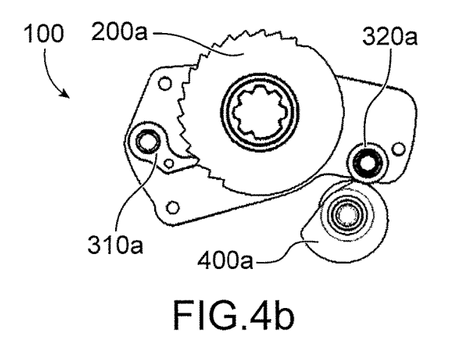
Figure 4C:
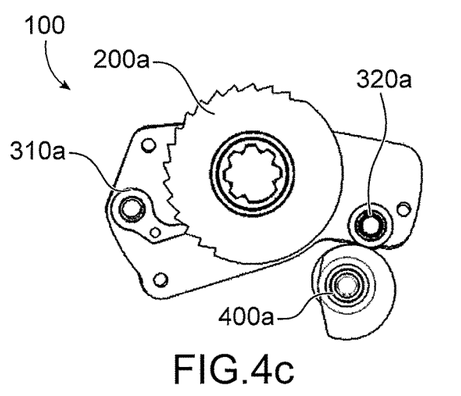
Figure 4D:
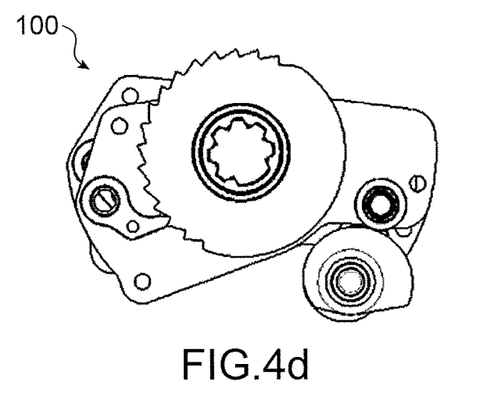
Figure 4E:
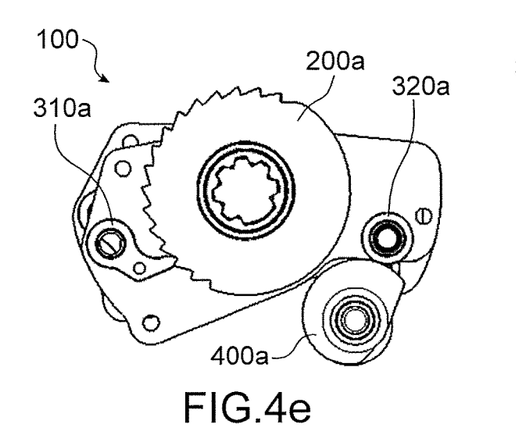
Figure 4F:
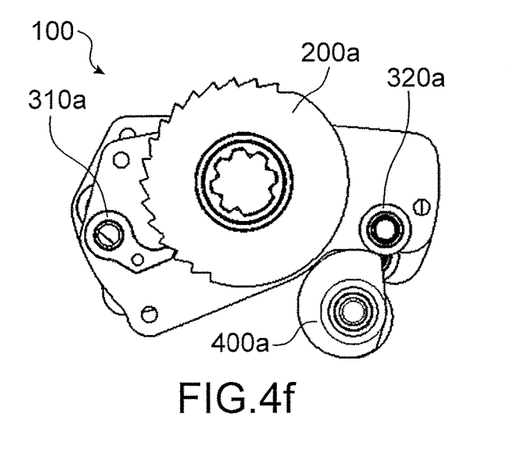
Figure 4G:
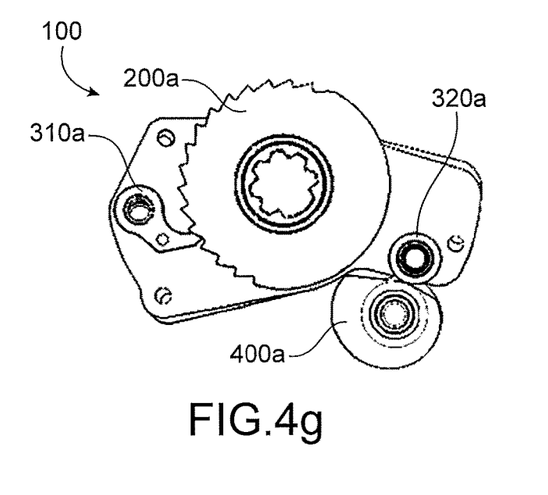

FIGS. 4a and 4b correspond to a phase of engagement of the first ratchet 310a against a tooth of the first toothed wheel 200a. In this respect, the profile of the first cam 400a which is associated with an engagement phase comprises a substantially flat section over a predetermined angular course of the said cam, for example 38° (Zone "A" in FIG. 6).

Figure 5A:
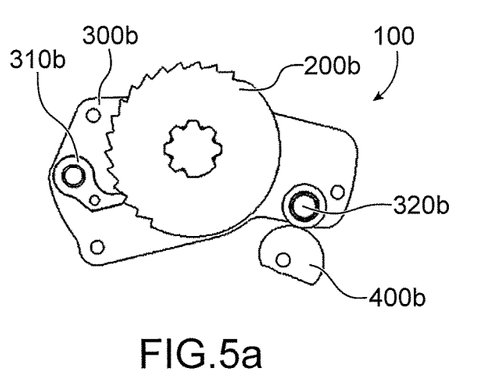
FIGS. 5a to 5g are schematic representations according to operating sequences of the transmission module, which are identical respectively to FIGS. 4a to 4g, and also according to an identical profile view, with the mechanism associated with the first wheel, the first ratchet and the first cam being however eliminated such as to permit the observation of the second wheel, the second ratchet and the second cam.
Figure 5B:
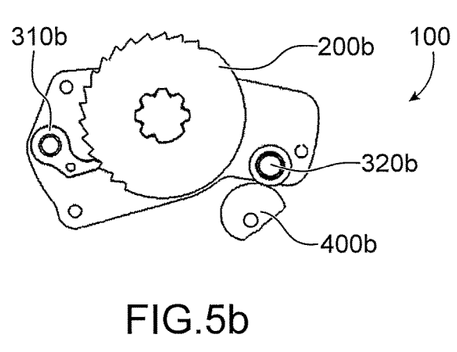

During this phase, the first ratchet 310a rises rapidly in contact with a tooth of the first toothed wheel 200a, such as to eliminate any gap between the tooth and the first ratchet 310a. In parallel with this phase of engagement of the first ratchet, the second cam 400b ends its second angular course, during which the second ratchet 310b is actuated (FIGS. 5a and 5b).

FIGS. 4b to 4e correspond to a phase in which the first ratchet 310a is actuated by the first cam 400a during the first angular course. The cam profile which is associated with this phase can for example correspond to a diverging spiral profile, for example over a first angular course of approximately 180° (Zone "B" in FIG. 6).

This first angular course also begins with a phase of disengagement of the second ratchet 310b (FIGS. 5b and 5c), according to an angular course of 55° for example.

Figure 5C:
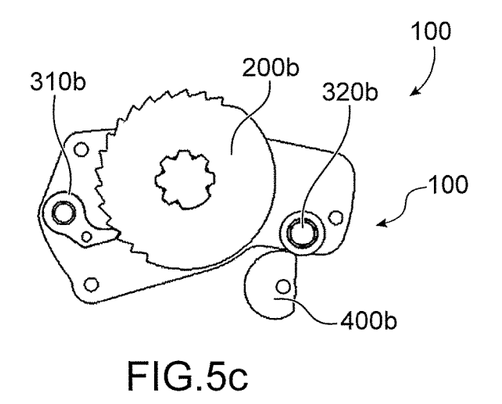

During this disengagement phase, the support of the second ratchet 310b on the tooth of the second toothed wheel 200b decreases until it is eliminated.

The phase of disengagement of the second ratchet 310b can be followed directly by a phase of rest (FIGS. 5c and 5d) of the said ratchet, during which the ratchet no longer drives the second wheel, and jumps to the following tooth.

Figure 5D:
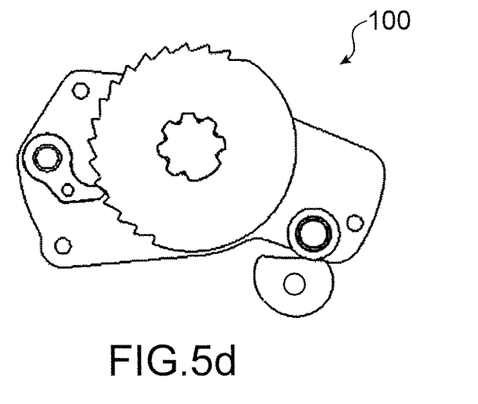
Figure 5E:
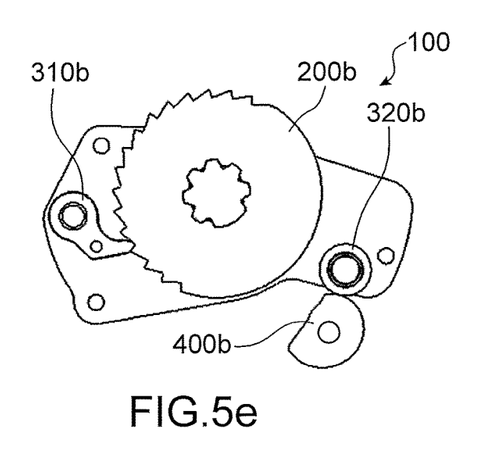
Figure 5F:
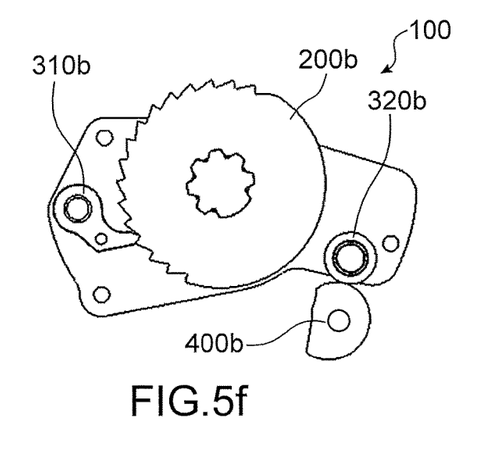
Figure 5G:
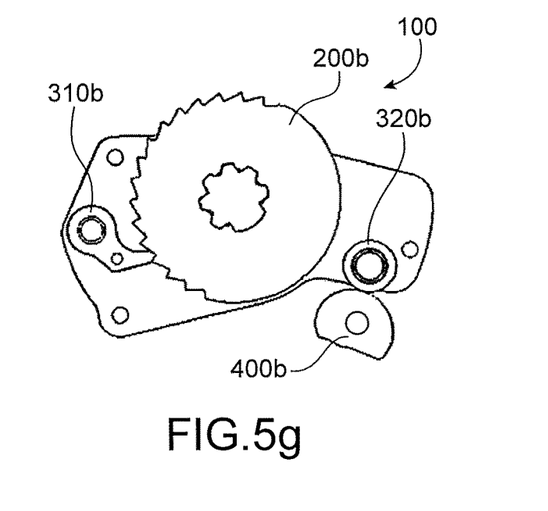
Figure 6:
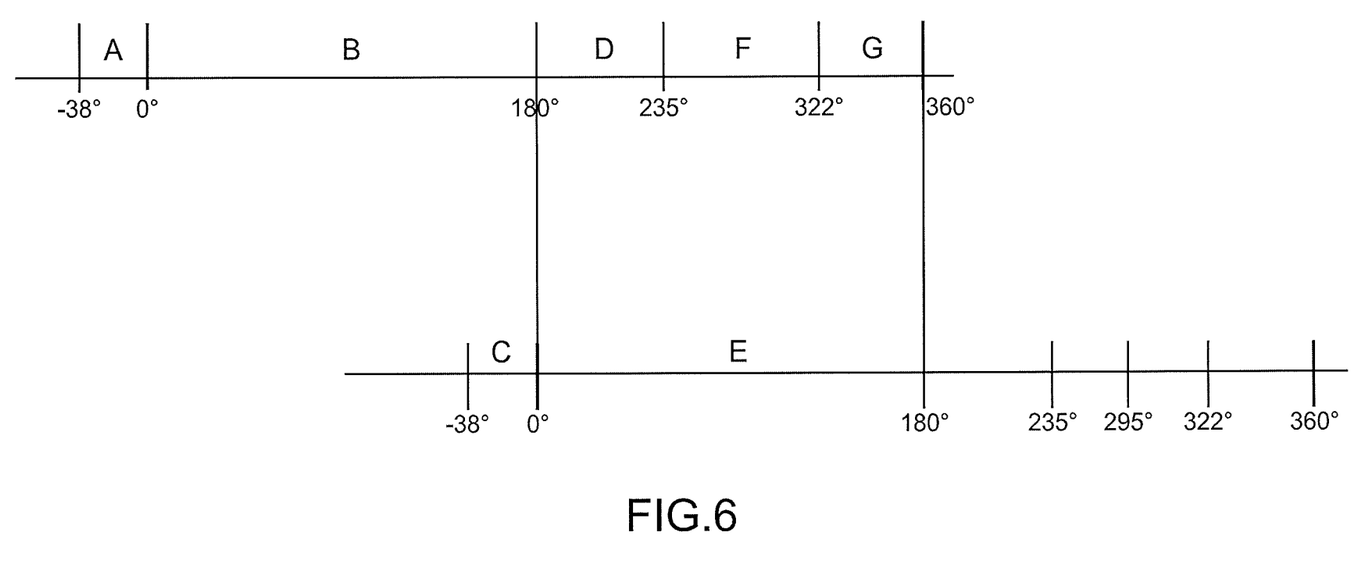
FIG. 6 is a temporal representation (horizontal axes) of the different operating phases of the transmission module according to the present invention, with the angular course of the first cam being represented in the upper part and that of the second cam in the lower part.

Finally, this phase of rest is in its turn followed by a phase of engagement of the second ratchet 310b (Zone "C" in FIG. 6, and FIGS. 5d and 5e). The times of the phase of engagement of the second ratchet 310b and of the phase of actuation of the first ratchet 310a are advantageously concurrent.

The phase of engagement of the second ratchet 310b is followed directly by the phases of disengagement of the first ratchet 310a (Zone "D" in FIG. 6, and FIGS. 4e and 4f), and of actuation of the second ratchet 310b (Zone "E" in FIG. 6, FIGS. 5e to 5g). The phase of disengagement of the first ratchet 310a corresponds to a decrease in the torque exerted by the said ratchet on the first wheel 200a, such that the second ratchet takes over fully the driving of the second wheel 200b (which is integral with the first wheel).

After the phase of disengagement of the first ratchet 310a, there follow in succession, for the first ratchet 310a, a phase of rest (Zone "F" in FIG. 6, and FIGS. 4f and 4g), and, after a jump to the following tooth, once more a phase of engagement (Zone "G" in FIG. 6, and FIG. 4f) which ends simultaneously with the phase of actuation of the first ratchet.

The operating sequences proposed above makes it possible to ensure the continuity of driving of the first and second toothed wheels, whilst minimising or even eliminating any jolting liable to take place, in particular on the said first and second toothed wheels. The absence of jolting makes it possible to maintain the mechanical intactness of the assembly of the force transmission module, and in particular the camshaft.

This operating mode thus makes it possible to ensure the mechanical durability of the module, and consequently to increase its reliability.

The transmission module which is described in the present invention is thus advantageously implemented in a mechanism for control of an electrical device (for example for cut-off of current), of the switch, circuit breaker or isolating switch type (FIG. 2). More particularly, the transmission module can be implemented in order to compress/rearm the spring for closure/opening of the electrical device.

REFERENCES

[1] EP 2 269 772
[2] U.S. Pat. No. 4,423,649

The invention claimed is:
1. A module for transmission of a force comprising:
at least one toothed wheel which is connected in a fixed manner to a main shaft which extends according to a main axis;
at least one first ratchet holder and one second ratchet holder which are provided respectively with a first ratchet and a second ratchet, each of the first and second ratchets being designed, when actuated, to rotate the at least one toothed wheel in a direction, known as a direct direction, around the main axis, by support of the ratchet concerned against a tooth of the at least one toothed wheel; and
at least two cams, which are connected immovably to one another, known respectively as a first cam and a second cam, and are designed to actuate respectively the first ratchet according to a first angular course around an axis of the first cam, and the second ratchet according to a second angular course around the axis of the second cam, which is different from the first angular course.

2. The module according to claim 1, wherein the first angular course and the second angular course have zero overlapping, and their sum is 360°.

3. The module according to claim 1, wherein the first angular course and the second angular course are each equal to 180°.

4. The module according to claim 1, wherein the at least two cams are designed such that the actuation of one and/or the other of the first and second ratchets, by the first cam and/or the second cam respectively, is preceded directly by a phase of engagement of said ratchet respectively by said first cam and/or said second cam, the engagement phase comprising supporting the ratchet concerned against the tooth of the at least one toothed wheel according to an angular course of respective engagement of said first cam and/or said second cam.

5. The module according to claim 1, wherein the at least two cams are designed such that the actuation of one and/or the other of the first and second ratchets, by the first cam and/or the second cam respectively, is followed directly by a phase of disengagement of said ratchet respectively by said first cam and/or said second cam, the disengagement phase comprising a decrease in the support of the ratchet against the tooth of the at least one toothed wheel according to a law of continuous decrease of said support according to an angular course of respective disengagement of said first cam and/or said second cam.

6. The module according to claim 1, wherein the first ratchet holder and the second ratchet holder are each in pivoting connection with the main shaft.

7. The module according to claim 1, wherein the at least two cams are integral with a camshaft extending according to the axis, substantially parallel to the main axis.

8. The module according to claim 1, wherein the first ratchet holder and the second ratchet holder are each provided with a roller, known respectively as a first roller and a second roller, against which the first cam and the second cam abut respectively, with the first cam and the second cam enforcing the actuation respectively of the first ratchet and the second ratchet, respectively via the first roller and the second roller, and their respective ratchet holders.

9. The module according to claim 1, wherein the at least one toothed wheel comprises a first toothed wheel and a second toothed wheel which are advantageously identical, and are designed to be rotated respectively by the first ratchet and the second ratchet.

10. The module according to claim 1, wherein a complete revolution around the axis by an assembly formed by the first and second cams gives rise to the rotation of the at least one toothed wheel according to an angular course corresponding to a tooth of the at least one toothed wheel.

11. The module according to claim 1, wherein the transmission module comprises means for rotation of the at least two cams around the axis using a drive means.

12. The module according to claim 1, wherein the first ratchet holder and/or the second ratchet holder are also designed to be manoeuvred manually.

13. The module according to claim 1, wherein the main shaft comprises two ends, at least one of which is designed to transfer a mechanical force to a mechanical accumulation system.

14. An electrical device comprising a module for transmission of a force according to claim 1.

* * * * *